US012517374B2

(12) United States Patent
Burgos et al.

(10) Patent No.: US 12,517,374 B2
(45) Date of Patent: Jan. 6, 2026

(54) OPTICAL LENS WITH A CONTINUOUS SCATTERING AREA

(71) Applicant: ESSILOR INTERNATIONAL, Charenton-le-Pont (FR)

(72) Inventors: Montserrat Burgos, Charenton-le-Pont (FR); Eric Gacoin, Charenton-le-Pont (FR); Aref Jallouli, Dallas, TX (US); Philippe Vaneeckhoutte, Charenton-le-Pont (FR); Hao-Wen Chiu, Dallas, TX (US); Matthieu Guillot, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 376 days.

(21) Appl. No.: 18/248,161

(22) PCT Filed: Oct. 8, 2021

(86) PCT No.: PCT/EP2021/077953
§ 371 (c)(1),
(2) Date: Apr. 6, 2023

(87) PCT Pub. No.: WO2022/074243
PCT Pub. Date: Apr. 14, 2022

(65) Prior Publication Data
US 2023/0384617 A1    Nov. 30, 2023

(30) Foreign Application Priority Data
Oct. 9, 2020    (EP) ..................................... 20306191

(51) Int. Cl.
*G02C 7/02*    (2006.01)
*B29D 11/00*    (2006.01)

(52) U.S. Cl.
CPC ........ *G02C 7/022* (2013.01); *B29D 11/00326* (2013.01); *B29D 11/00865* (2013.01); *G02C 2202/24* (2013.01)

(58) Field of Classification Search
CPC ...... G02C 7/022; G02C 2202/24; G02C 7/16; B29D 11/00326; B29D 11/00865; B29D 11/00009
See application file for complete search history.

(56) References Cited

U.S. PATENT DOCUMENTS 6,558,586 B1    5/2003  Padiou et al.
11,543,681 B2 *  1/2023  Neitz ............... B29D 11/00009
(Continued)

FOREIGN PATENT DOCUMENTS

CN    119002094 A  * 11/2024  ............... G02C 7/06
EP    2 887 129       6/2015
(Continued)

OTHER PUBLICATIONS

International Search Report and Written Opinion dated Jan. 26, 2022 issued in International Application No. PCT/EP2021/077953 (11 pages).

*Primary Examiner* — William Lu
(74) *Attorney, Agent, or Firm* — NIXON & VANDERHYE (57) ABSTRACT

Disclosed is an optical lens including at least one continuous scattering area having a characteristic dimension d greater than or equal to 2 mm. Any sub-area of characteristic dimension $d_{sub}$ included in the at least one continuous scattering area, with $d_{sub}$ greater than or equal to 0.05 mm, verifies: |% Iscat_area−% Iscat_subarea|<0.2*% Iscat_area, where % Iscat_area is the average intensity ratio of light
(Continued)

scattered by the continuous scattering area, and %I$_{scat\_subarea}$ is the average intensity ratio of light scattered by the sub-area.

19 Claims, 3 Drawing Sheets

(56) References Cited

U.S. PATENT DOCUMENTS

| | | | |
|---|---|---|---|
| 11,914,228 B2 * | 2/2024 | Hones | G02C 7/10 |
| 12,050,369 B2 * | 7/2024 | Legerton | G02C 7/022 |
| 12,111,518 B2 * | 10/2024 | Hones | A61B 3/04 |
| 2010/0178858 A1 | 7/2010 | Stephane | |
| 2011/0313058 A1 | 12/2011 | Neitz et al. | |
| 2014/0117397 A1 * | 5/2014 | Saeki | G02B 5/0268 |
| | | | 264/1.36 |
| 2014/0355123 A1 * | 12/2014 | Oh | B29D 11/00278 |
| | | | 427/508 |
| 2017/0269380 A1 * | 9/2017 | Liao | G02B 1/14 |
| 2017/0276961 A1 * | 9/2017 | Wooley | G02C 7/044 |
| 2019/0033619 A1 * | 1/2019 | Neitz | G02C 7/02 |
| 2019/0235279 A1 * | 8/2019 | Hones | B29D 11/00326 |
| 2020/0241325 A1 * | 7/2020 | Chalberg | B29D 11/00038 |
| 2021/0003867 A1 * | 1/2021 | Takenaka | B05D 3/06 |
| 2021/0055573 A1 * | 2/2021 | Back | G02C 7/042 |
| 2022/0035179 A1 * | 2/2022 | Rappon | G02C 7/061 |
| 2023/0111585 A1 * | 4/2023 | Alonso | G02C 7/022 |
| | | | 351/159.74 |
| 2023/0128895 A1 * | 4/2023 | Gacoin | B29D 11/00528 |
| | | | 351/159.41 |
| 2023/0213784 A1 * | 7/2023 | Gacoin | G02C 7/022 |
| | | | 351/159.42 |

FOREIGN PATENT DOCUMENTS

| | | | |
|---|---|---|---|
| EP | 3923061 A1 * | 12/2021 | G02C 7/022 |
| WO | 01/66308 A1 | 9/2001 | |
| WO | 2009/016295 A1 | 2/2009 | |
| WO | 2018/026697 A1 | 2/2018 | |
| WO | 2018/208724 | 11/2018 | |
| WO | WO-2019206569 A1 * | 10/2019 | G02C 7/06 |
| WO | 2020/014613 | 1/2020 | |
| WO | WO-2020014613 A1 * | 1/2020 | G02C 7/16 |
| WO | 2020/180817 | 9/2020 | |

* cited by examiner

OPTICAL LENS WITH A CONTINUOUS SCATTERING AREA

This application is the U.S. national phase of International Application No. PCT/EP2021/077953 filed Oct. 8, 2021 which designated the U.S. and claims priority to EP 20306191.6 filed Oct. 9, 2020, the entire contents of each of which are hereby incorporated by reference.

FIELD OF THE DISCLOSURE

The disclosure relates to an optical lens comprising at least a continuous scattering area and a method of manufacturing such optical lens.

BACKGROUND OF THE DISCLOSURE

Myopia of an eye is characterized by the fact that the eye focuses distant objects in front of its retina, hypermetropia is characterized by the fact that the eye focuses distant objects behind its retina. Myopia is usually corrected using a concave lens providing negative dioptric power and hypermetropia is usually corrected using a convex lens providing positive dioptric power.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defects may have an impact on the progression of myopia of such individuals. One may observe that for most of said individuals the myopia defect tends to increase over time partly caused by long and intensive near work sessions.

In particular, studies carried out on monkeys have shown that strong defocusing of the light behind the retina, which occurs away from the foveal zone, may cause the eye to extend and therefore may cause a myopia defect to increase.

Recent improvements in the field of ophthalmic lenses, have allowed developing optical lenses comprising discrete optical elements to prevent, or at least slow down, the progression of abnormal refractions of an eye such as myopia or hyperopia.

An existing solution is based on inducing blur on the periphery of retina using discrete scattering elements such as bump, recess, or dots.

Such a solution presents drawbacks, in particular the homogeneity of the lens in the periphery is poor, leading to several optical concerns.

The existing solution may led to a diffractive concern. Indeed, small scattering discrete element uniformly spaced may provide some diffractive order, visible when the user see a small and intense light source such as car headlight at night. Such diffraction provides discomfort for the wearer.

The existing solution may lead to dirty lens effects. For example, when intense light, such as sunlight reaches the lens, having a light beam being non perpendicular to the lens surface, for instance having an angle between 45°-90° with the lens surface, the scattered light is visible both by the wearer and by an observer.

Using discrete scattering elements may create a kind of set brilliant dots, as do dust particles floating in sunlight, creating visual disturbance for the user and unaesthetical perception for an observer.

Using discrete scattering elements may also create variable levels of perceived scatterings by the user, for instance, when the scattering elements are provided thanks to an eyewear lens. Indeed, when the user is moving eyes in different directions, even slightly, the number of discrete scattering elements contributing to the perceived scattering will vary, leading to variable contrast and so disturbing visual comfort.

The prior art solution may further led to fluctuation on perceived haze by the user.

The existing solution may further raise aliasing concerns.

In particular, when looking at digital display, the periodic pattern of the scattering discrete element and the periodic pattern of the display pixels may combine to induce unwanted fringes caused by aliasing, that is visually disturbing.

Finally, the manufacturing of the discrete scattering elements is complex. Having a discrete scattering element being able to scatter a certain amount of light is not easy to produce, since any geometrical deviation may provide a very different level of scattered light.

For instance, when manufacturing scattering discrete elements using mass production tools, such as mold for casting, or insert for injection molding, the production tools having scattering element structures on their internal surface may be damaged leading to different scattering level over time.

As indicated, the existing solutions have drawbacks.

Therefore, there is a need for a new optical lens having improved scattering features, in particular to prevent, or at least slow down, the progression of abnormal refractions of an eye such as myopia or hyperopia, and more generally to provide scattering property without the mentioned drawbacks. A goal of this disclosure is to provide such a new optical lens.

SUMMARY OF THE DISCLOSURE

To this end, the disclosure proposes an optical lens comprising:
at least one continuous scattering area having a characteristic dimension d greater than or equal to 2 mm,
wherein any sub-area of characteristic dimension $d_{sub}$ comprised in the at least one continuous scattering area, with $d_{sub}$ greater than or equal to 0.05 mm, verifies:

$$|\% \text{Iscat\_area} - (\% \text{Iscat\_subarea})| < 0.2 *\% \text{Iscat\_area}$$

with
% Iscat_area the average ratio of visible light intensity scattered by the continuous scattering area, and
% Iscat_subarea the average ratio of visible light intensity scattered by the sub-area.

Advantageously having continuous scattering area allows not to have the drawbacks of the prior art optical lenses, in particular no effect of diffractive order/interference, no dust in sun light effect, the wearer does not experience fluctuation when moving his eye, the manufacturing of the lens can be very simple, since suppressing the problem of manufacturing structure requiring to have accurate process for respecting geometry.

According to further embodiments which can be considered alone or in combination:
the optical lens comprises a scattering region comprising the at least one scattering area and having variable visible light scattering property between the geometrical center of the optical lens and the periphery of the optical lens; and/or the optical lens comprises a lens material having two opposite optical faces; and/or the scattering is measured in transmission; and/or the scattering property increases radially from the geometrical center of the optical lens to the periphery of the optical lens; and/or a central region of the optical lens, consisting of the region at a distance smaller than or equal to 10 mm, for example 8 mm from a reference point, has a haze smaller than or equal to 0.5%, for example smaller than or equal to 0.3%; and/or a peripheral region of the optical lens, consisting of the region at a distance greater than or equal to 15 mm, for example 20 mm, from a reference point, has a haze greater than or equal to 1%, for example greater than or equal to 20%; and/or the optical lens comprises a transition region disposed between the central region and the peripheral region of the optical lens, and the variation of haze between the central region and the transition region and/or the variation of haze between the transition region and the peripheral region is continuous, for example linear, monotonous, or binary; and/or the optical lens further comprises a plurality of continuous scattering areas positioned on a structured mesh, for example a squared mesh or a hexagonal mesh or a triangle mesh or an octagonal mesh or a random mesh; and/or the optical lens further comprises a plurality of continuous scattering areas arranged as a plurality of concentric scattering rings with a haze greater than or equal to 1% alternating with clear areas with a haze smaller than or equal to 0.3%; and/or the optical lens is an ophthalmic lens intended to be worn in front of an eye of a wearer having at least one prescribed refractive power Px and wherein the at least one continuous scattering area provides an optical function of not focusing an image on the retina of the eye of the wearer so as to slow down the progression of the abnormal refraction of the eye; and/or the continuous scattering areas provide scattering on the retina, and so a loss of visual contrast/visual acuity, such that this reduction of visual acuity/contrast promotes myopia progression slowdown; and/or the loss of acuity/contrast is less than 0.75 Log CS for range of spatial frequencies between 0.125 cycle/degree to 8 cycles/degree; and/or the optical lens comprises one or a plurality of localized diffusion points, wherein the localized diffusion points include core-shell particles. The core of the core-shell particles includes a metal and/or a metal oxide and/or a plurality of quantum dots and/or at least one polymer of a different index from the matrix of the lens. The shell may be a polymer and is configured to provide optimal bonding of the core-shell particles with the matrix of the lens. The polymer may further be configured to provide crosslinking between adjacent core-shell particles. The diameter of the core-shell is greater than or equal to 100 nm and lower than or equal to 1 micrometer. The plurality of localized diffusion points may include core-shell particles whose cores are of varying diameters depending on their position in the matrix.

The disclosure also relates to a method of manufacturing an optical lens comprising the steps of:

manufacturing a lens material having two opposite optical faces, and manufacturing at least one continuous scattering area having a characteristic dimension d greater than or equal to 2 mm, wherein any sub-area of characteristic dimension $d_{sub}$ comprised in the at least one continuous scattering area, with $d_{sub}$ greater than or equal to 0.05 mm, verifies:

|% Iscat_area−% Iscat_subarea|<0.2*% Iscat_area, with

% Iscat_area the average ratio of visible light intensity scattered by the continuous visible light scattering area, and % Iscat_subarea the average ratio of visible light intensity scattered by the sub-area.

According to further embodiments which can be considered alone or in combination:

the manufacturing of the at least one continuous scattering area is obtained using a mold for a lens element having a continuous roughness area with a RMS roughness greater than or equal to 15 nm; and/or the manufacturing of the at least one continuous scattering area is obtained by deposition of a coating providing haze on at least one optical face; and/or the manufacturing of the at least one continuous scattering area is obtained by using a fluorescent dye; and/or the manufacturing of the at least one continuous scattering area is obtained by making the optical lens with a scattering material and by adjusting the thickness of said scattering material; and/or the manufacturing of the at least one continuous scattering area is obtained by surfacing at least one optical face of the optical lens; and/or the manufacturing of the at least one continuous scattering area is obtained by polishing at least one optical face of the optical lens with a gross abrasive pad; and/or the manufacturing of the at least one continuous scattering area is obtained by deposition of at least one core-shell particle during and/or after the design of the lens, and/or the manufacturing of the lens is obtained by additive manufacturing via polymer jetting, using a first material without core-shell to make the diffusion, and a second material to make the rest of the glass, and/or the core-shell material is deposited in one or more layers encapsulated in the second material, and/or the first material is made of one or more layers of scattering material, and/or the first material comprises patterns to reproduce local variations in scattering.

BRIEF DESCRIPTION OF THE DRAWINGS

Embodiments of the disclosure will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE DISCLOSURE

The disclosure relates to an optical lens comprising at least one continuous scattering area. Moreover, the optical lens is intended to be worn in front of an eye of a person to provide eyesight correction and prevent or at least slow down a progression of abnormal refractions of the eye such as for example myopia, hyperopia or astigmatism.

In the description, terms like <<up>>, <<bottom>>, <<horizontal>>, <<vertical>>, <<above>>, <<below >>, <<front>>, <<rear>> or other words indicating relative position may be used. These terms are to be understood in the wearing conditions of the lens element.

In particular, in the context of the present disclosure, the term "optical lens" can refer to a contact lens, an intraocular lens, a corneal inlay and only, an uncut optical lens or a spectacle optical lens edged to fit a specific spectacle frame or an ophthalmic lens or an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

The contact lens may be of any kind, including, daily wear soft contact lenses, rigid gas permeable contact lenses, bifocal contact lenses, toric contact lenses and hybrid contact lenses.

The disclosure relates to an optical lens, for example intended to be worn in front of an eye of a wearer. As represented on FIG. 1, an optical lens 10 according to the disclosure typically comprises two opposite optical faces F1 and F2.

Figure 1:
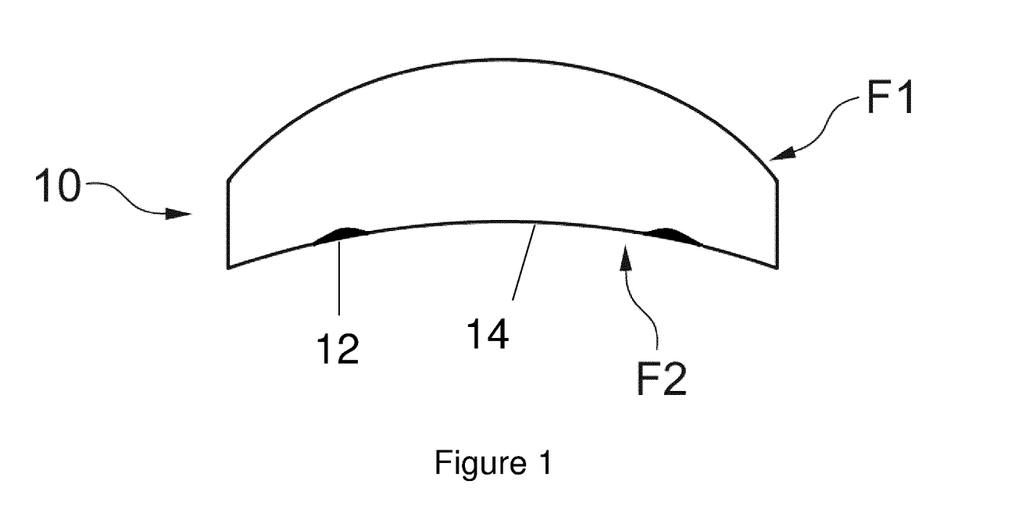
FIG. 1 illustrates a plan view of a lens blank provided in a method according to an embodiment of the disclosure.

The optical lens according to the disclosure has a main optical function and comprises at least one, for example a plurality of, continuous scattering area 12.

According to a preferred embodiment the main optical function is based on the prescription of the wearer for correcting an abnormal refraction of the eye of the wearer.

The term "prescription" is to be understood to mean a set of optical characteristics of optical power, of astigmatism, of prismatic deviation, determined by an ophthalmologist or optometrist in order to correct the vision defects of the eye, for example, by means of a lens positioned in front of his eye. For example, the prescription for a myopic eye comprises the values of optical power and of astigmatism with an axis for the distance vision.

In the sense of the disclosure, the optical function corresponds to a function providing for each gaze direction the effect of the lens element on the light ray passing through the lens element in specific wearing conditions, for example in standard wearing conditions.

The optical function may comprise as dioptric function, light absorption, polarizing capability, reinforcement of contrast capacity, etc. . . . .

The dioptric function corresponds to the lens element power (mean power, astigmatism etc. . . . ) as a function of the gaze direction.

The specific wearing conditions preferably relates to standard wearing conditions, however the specific wearing condition may be personalized wearing conditions that are measured on the wearer when the wearer wears a spectacle frame he/she chose.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8θ.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°.

The optical lens according to the disclosure comprises at least one continuous scattering area 12 having a characteristic dimension d greater than or equal to 2 mm.

Each continuous scattering are is characterized by the fact that over said continuous scattering area any sub-area of characteristic dimension $d_{sub}$ comprised in the at least one continuous scattering area, with $d_{sub}$ greater than or equal to 0.05 mm, verifies:

$$|\% Iscat\_area - \% Iscat\_subarea| < 0.2 * \% Iscat\_area$$

with
- % Iscat_area the average ratio of visible light intensity scattered by the continuous scattering area, and
- % Iscat_subarea the average ratio of visible light intensity scattered by the sub-area.

Advantageously, the at least one continuous scattering area provides an optical function of not focusing an image on the retina of the eye of the wearer so as to slow down the progression of the abnormal refraction of the eye.

As illustrated on FIG. 1, the optical lens according to the disclosure may comprise a refraction area 14 formed as the area other than the continuous scattering area 12. The refraction area typically has an optical function corresponding to the main optical function, in other words the refraction area has a refractive power based on the prescription for the eye of the wearer.

A lens element 10 according to the disclosure as represented on FIG. 1, comprises an object side surface F1 formed as a convex curved surface on FIG. 1 toward an object side, and an eye side surface F2 formed as a concave surface on FIG. 1 having a different curvature than the curvature of the object side surface F1.

According to an embodiment of the disclosure, at least part, for example all, of the continuous scattering area are located on the front surface of the optical lens.

At least part, for example all, of the continuous scattering area may be located on the back surface of the optical lens.

According to a preferred embodiment, at least part, for example all of the continuous scattering area are located between the front and the back surfaces of the optical lens.

Figure 3:
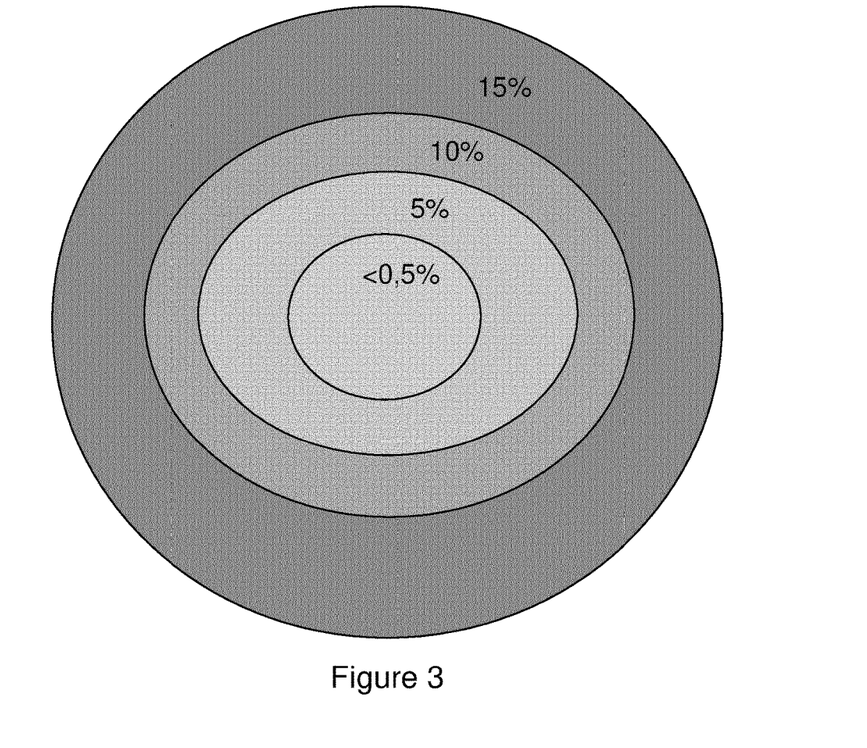
FIG. 3 illustrates a plan view of an optical lens having variable visible light scattering property.

According to an embodiment of the disclosure, the optical lens comprises a scattering region comprising the at least one scattering area 12 and having variable visible light scattering property between the geometrical center of the optical lens and the periphery of the optical lens as represented on FIG. 3.

According to possible embodiments of the disclosure the light scattering property may vary according to a linear variation, monotonous variation, or a binary transition.

For example, the scattering properties, such as haze, increases between the geometrical center of the optical lens and periphery of the optical lens.

Preferably, the optical lens comprises a transition region disposed between the central region and the peripheral region of the optical lens, and the variation of haze between the central region and the transition region and/or the variation of haze between the transition region and the peripheral region is continuous.

In other words, there is no discontinuity in the ratio of scattering between center/periphery, but a smooth transition.

The central region of the optical lens, consisting of the region at a distance smaller than or equal to 10 mm, for example 8 mm from a reference point, may have a haze smaller than or equal to 0.5%, for example smaller than or equal to 0.3%.

The peripheral region of the optical lens, consisting of the region at a distance greater than or equal to 15 mm, for example 20 mm, from a reference point, may have a haze greater than or equal to 1%, for example greater than or equal to 20%.

The reference point used to define the central and peripheral regions may be the geometrical center of the optical lens or the optical center of the optical lens.

According to embodiment, the reference point may be the fitting cross, or the far vision reference point or near vision reference point when such points exist on the optical lens.

According to another embodiment of the disclosure, the continuous scattering areas are positioned on a structured mesh.

According to another embodiment of the disclosure, a transition region is disposed between the central region and the peripheral region. The variation of haze between the central region and the transition region and/or the variation of haze between the transition region and the peripheral region is continuous.

According to another embodiment of the disclosure, the optical lens comprises a plurality of continuous scattering areas arranged as a plurality of concentric scattering rings with a haze greater than or equal to 1% alternating with clear areas with a haze smaller than or equal to 0.3%.

According to another embodiment of the disclosure, the optical lens comprises an array of alternate areas of substrate without scattering (clear areas with haze smaller than or equal to 0.3%) and scattering areas of homogeneous scattering with a haze greater than or equal to 1%. According to a preferred embodiment, the array of alternate areas is arranged as a plurality of concentric scattering and non-scattering rings.

The level of haze can be the same in the different scattering areas of the array, or it can vary, in order to increase or decrease the haze, and increase or decrease the acuity of the wearer and/or image quality, and/or increase or decrease the Modulation Transfer Function measured in different areas of the lens.

The difference between an alternate of scattering areas and a continuous scattering area on the whole lens can be on aesthetics, because alternate of clear areas and scattering areas could be more visible for the observer. This problem may be solved by choosing limited scattering level or by using small sizes of scattering areas (<1 mm).

Another aspect is that alternate clear and scattering areas could be disturbing for the wearer and create visual defects. We can think of alternate rings of different power on contact lenses for example: but as scattering does not create any image (or a defocused image), but only diffuse the rays in all the directions, there could be no more bad effect, once they rays arrive on the retina, than a continuous scattering, if the sizes are well chosen to integrate in the pupil both clear and scattering areas.

According to another embodiment of the disclosure, the optical lens comprises one or a plurality of localized diffusion points, wherein the localized diffusion points include core-shell particles that can be set on a part or on the whole lens surface. The core of the core-shell particles may be of different compositions and diameters as illustrated on FIG. 5 and FIG. 6.

Figure 5:
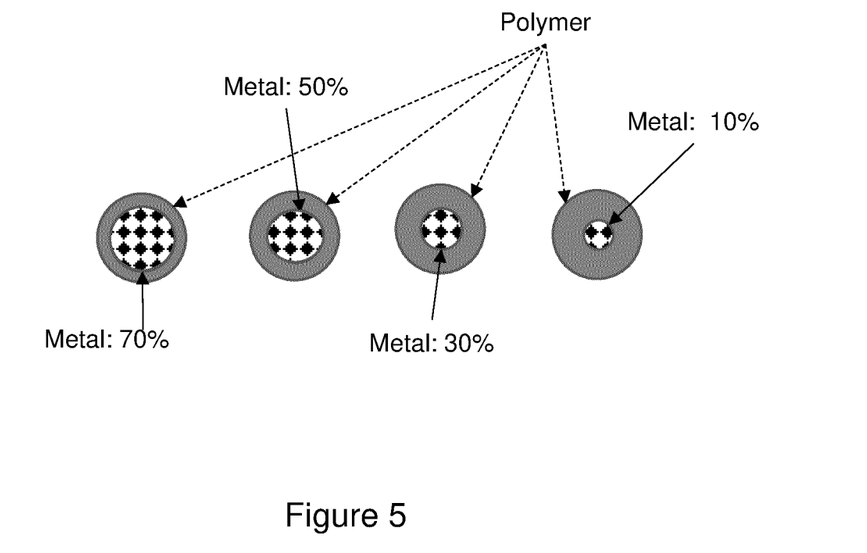
FIG. 5 illustrates core-shell particles having different core diameters.

The core of the core-shell particle may include a metal (for example Au or Ag) and/or a metal oxide (for example $AlO_2$ or $TiO_2$) and/or a plurality of quantum dots and/or at least one polymer of a different index from the matrix of the lens. The shell may be a polymer and is configured to provide optimal bonding of the core-shell particles with the matrix of the lens. The polymer may further be configured to provide crosslinking between adjacent core-shell particles. The diameter of the core-shell is greater than or equal to 100 nm and lower than or equal to 1 micrometer. The plurality of localized diffusion points may include core-shell particles whose cores are of varying diameters depending on their position in the matrix of the lens. For instance, the volume of the core of the core-shell particle may represent 1% to 100% of the total volume of the core-shell particle. FIG. 5 illustrates four core-shell particles whose core includes metal and wherein the volume of the core represents 10%, 30%, 50% and 70% of the total volume of the core-shell particle respectively.

Figure 6:
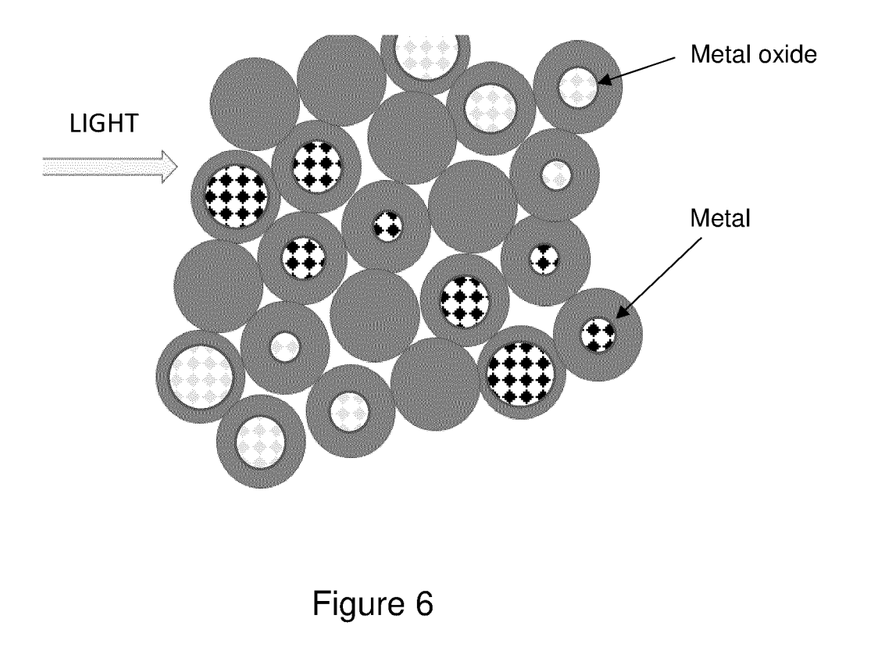
FIG. 6 illustrates an assembly of different types and diameters of core-shell particles.

Advantageously, the quantity, the position and the diameter of the core-shell particles and the composition and the diameter of the core of the core-shell particles can be tuned to obtain the desired scattering. FIG. 6 illustrates an assembly of several core-shell particles whose cores are of different diameters and compositions. Thus, the level of haze can be the same in different scattering areas, or it can vary, in order to increase or decrease the haze, and increase or decrease the acuity of the wearer and/or image quality, and/or increase or decrease the Modulation Transfer Function measured in different areas of the lens.

According to possible embodiments of the disclosure, the light scattering property may vary between the center and the periphery of the lens according to a linear variation, monotonous variation, or a binary transition. Even more complex spatial variations of the light scattering property can be considered according to the needs of the wearer. Near vision areas and far vision areas may further be considered for the tuning of the density, diameter and composition of the core-shell particles.

The measurement of scattered light can be done using standard method, for instance based on hazemeter following requirement of transmission haze, using for instance standard ASTM D1003.

Using such standard, it is possible to measure haze on an optical lens on an area of a few mm, for instance 2 mm.

Figure 4:
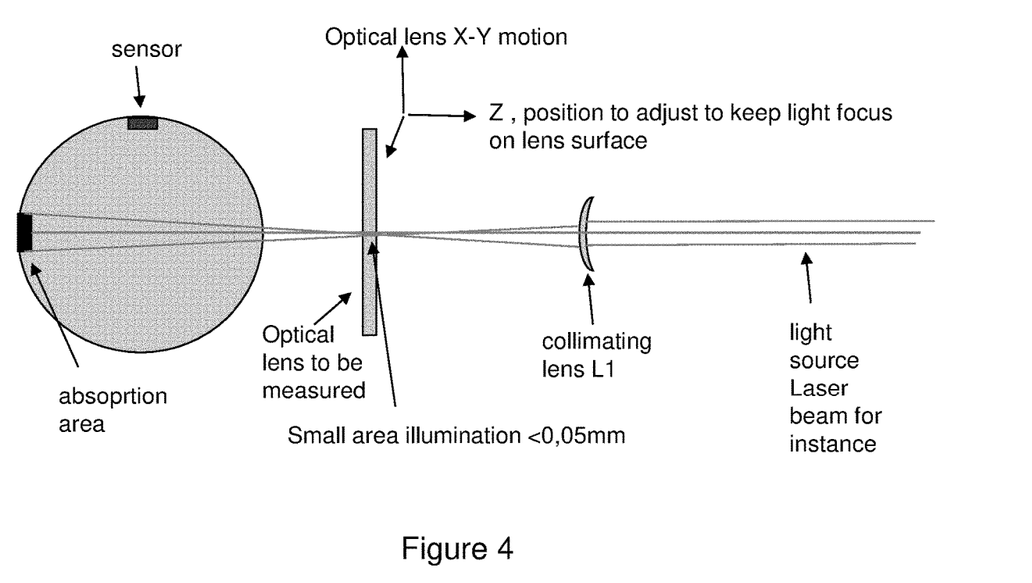
FIG. 4 represents a measuring device for measuring light scattering property of an optical lens.

To get a measurement on smaller areas for example around 0.05 mm, it is possible to use a device as illustrated on FIG. 4. Such device comprises focusing lens so that the optical lens to be tested is illuminated only on this small area. The focusing lens is placed between the optical lens to be measured and a light source, typically laser beam, so that the spot of light reaching the optical lens to be measure has the size of the small area, for instance 0.050 mm.

The optical lens to be measured can then be moved, with small X-Y steps for example smaller than 0.05 mm, so as to scan the 2 mm size scattering area, and to check that the amount of scattered light is non zero whatever the position of the optical lens, and to check it complies with requirement of limited variations of level of scattered light within the 2 mm size scattering area.

As an alternative, a mask be use, being located close to the optical lens to be measured. This mask has apertures being equal to the size of the small area.

The optical lens to be measured can be for instance measured in a large area (for instance 2 mm) via measurement of n multiple contiguous small areas (smaller than 0.050 mm), covering the whole large area.

The optical lens to be measured may be movable on X-Y direction to scan the lens, at least on the large area surface, and for conduction measurement at any location It may also be possible to add Z motion (along the optical axis of the optical lens to be measured), so that it is possible to keep constant distance between the lens and the collimated spot of light, so that size of spot of light reaching the lens is constant when moving in the X-Y direction, even for lenses having strong curvature.

The disclosure also relates to a method of manufacturing an optical lens.

Figure 2:
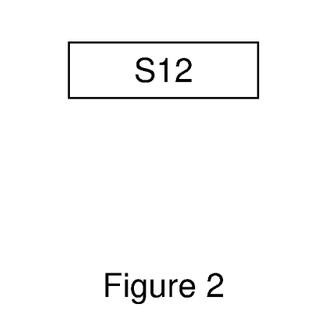
FIG. 2 is a chart-flow representative of a method according to an embodiment of the disclosure.

As illustrated on FIG. 2, the method of the disclosure comprises at least a step S12 of manufacturing at least one continuous scattering area.

The at least one continuous scattering area has a characteristic dimension d greater than or equal to 2 mm and for any sub-area of characteristic dimension $d_{sub}$ comprised in the at least one continuous scattering area, with $d_{sub}$ greater than or equal to 0.05 mm, verifies:

|% Iscat_area–% Iscat_subareal<0.2*% Iscat_area with % Iscat_area the average ratio of visible light intensity scattered by the continuous visible light scattering area, and % Iscat_subarea the average ratio of visible light intensity scattered by the sub-area.

Several methods are possible to obtain a continuous scattering area.

According to an embodiment of the disclosure, the method comprises the manufacturing of the at least one continuous scattering area by using a mold for a lens element having a continuous roughness area with a RMS roughness greater than or equal to 15 nm.

The roughness may vary between center and periphery of the mold to provide variation of scattering level.

The relationship between optical scattering and surface roughness is described as follow:

$$TIS_{BP}(R_q) = R_0 \left[ 1 - e^{-\left(\frac{4\pi R_q \cos\theta_i}{\lambda}\right)^2} \right]$$

Where:
  $TIS_{BP}$ is Total Integrated Scatter per Bennett and Porteus, which defines the total amount of light scattered by a surface
  R0 is the theoretical reflectance of the surface
  $R_q$ is the RMS roughness of the surface
  $\theta_i$ is the angle of incidence on the surface
  $\lambda$ is the wavelength of light.

For determining the scattering energy for a transmissive surface, such as the scattering provided by the roughness of a lens surface having refractive index n with air interface, one can take as an approximation:

$$TIStrans=(2\pi/\lambda*(n-1)\cdot Rq)^2$$

For instance, for n=1.6 and Rq=20 nm and $\lambda$=550 nm, one finds TIStrans=1.8%
For Rq=65 nm, one finds TIStrans=19.2%

Increasing radially the RMS roughness of the surface of the mold from 5 nm a the central region of the surface of the mold to 50 nm at the peripheral region of the mold may result in a lens having a haze of 0.2% at the center to about 10% near the edge (for a light at normal incident).

Advantageously, such process allows having a high randomized roughness meaning that no specific spatial frequency peak appears, that could otherwise create diffraction and increased haze for specific angle.

The roughness on the surface of the mold may be provided using a polishing pad with abrasive. For example, one may provide a polished insert whose surface is worked using polishing pad with abrasive. A mask may be used to protect the central part of the surface of the mold from abrasion.

According to another embodiment of the disclosure, the method comprises the manufacturing of roughness during the mold surface surfacing process.

The surface roughness of a diamond-turned mold surface depends on both the radius of the diamond tip and the process controls including spindle speed, X-Z movements, and so can be varied using different process control or different diamond tip in different mold surface area.

According to a further embodiment of the disclosure, the level of scattering of the at least one continuous scattering area may be adjusted by deposition of a coating providing haze on at least one optical face having a rough surface.

For example, using different hard coatings with different refractive indexes may provide different scattering levels in combination with the surfaces of the optical lens, in particular with the rough surface.

A hard coating may be used to reduce the scattering provided by the rough surface. The more the refractive index of the hard coating is close to the refractive index of the substrate, the more the scattering is reduced.

For example, using two different hard coatings having two different refractive indexes on the same substrate having a given refractive index provides different scattering: higher scattering for the hard coating having the largest difference of refractive index with the substrate.

Advantageously, it is possible to provide different levels of scattering using the same lens or semi-finished lens, just by selecting different hard coatings for different areas of the lens.

For example, the coatings may have variable level of haze and/or may have different thicknesses, for instance thicker on periphery than on the lens center, and/or being a mix of two different hard coatings formulations having different levels of haze. Example of such coating is provided in patent US2014355123.

The coatings may be deposited via spray coating or inkjet coating or via spin coating or dip coating.

According to another embodiment of the disclosure, a specific additional layer having diffusing property may be deposited on at least one optical face of the optical lens, and then a coating is deposited on top of it, the coating having no scattering properties.

According to an embodiment of the disclosure, the manufacturing of the at least one continuous scattering area is obtained by using a fluorescent dye also referred to as an optical brightener, such as described in patent EP2887129.

The fluorescent dye has an absorption spectrum in the UV range (320-340 nm for instance), and re-emits light via fluorescence in longer wavelengths, for instance in blue range (420-450 nm for instance). Since the light emitted by the optical brightener is emitted in any direction, it reduces contrast and provides haze. The level of haze and the loss of contrast can be tuned by adjusting the concentration of optical brightener or the thickness of material having such brightener. Optical brighteners can be provided in a hard coating, on front and/or back side of the lens, or embedded in the substrate.

When provided in a coating, it may be possible to mix via inkjet/spray coating one coating having brightener and similar coating without brightener, and adjust the ratio of the mix to have different levels of haze in different parts of the lens.

According to another embodiment of the disclosure, the manufacturing of the continuous scattering area is obtained by making the optical lens with a scattering material and by adjusting the thickness of said scattering material. This allows a variable diffusion (i.e. a variable haze) between center and periphery of the optical lens.

According to another embodiment of the disclosure, it may be used in a form of a wafer or a film that is then be casted or overmolded in injection process.

To reach a variable haze from center to edge, a minus power wafer may be used where the center thickness of the wafer is lower than a specified value (which is determined by the haze value of the material), and the wafer thickness is increasing from center to edge, for instance from 0.5 mm to 1.1 mm. Haze of a transparent material is typically a result of attenuation of light due to scattering, which can be expressed as:

$$I=I_0 *e^{-tx}$$

where $I_0$ is the incident light intensity, I is the transmitted intensity, x the thickness of the material, and t the turbidity of the material.

Such wafer may be used by injecting behind it a clear resin (haze <0.3%) according to the overomolding process known in the art. Further, one can also use above-mentioned thermoplastics to produce minus lenses directly. The resulting lenses would have varying haze levels from center to edge. However, unlike the wafer approach, the haze gradient depends on the powers of the lenses.

If using a film, this film may be flat and of uniform thickness, having variable transmission between center and periphery thanks to, for instance, variable roughness on at least one of its surfaces. This film may include hardCoat deposited on the outermost film surface, and an antireflection coating deposited on the hardcoat.

This film may be then laminated on the lens, using a step of thermoforming to curve the film, then a step of gluing the film on the lens substrate.

In an alternative, the film may have no hardcoat and no antireflection coating, and may be embedded in between substrate. For instance, the film may be placed in the cavity between two casting molds, then thermoset polymer may be filled in the molds to provide a finished lens or a semi finished lens having embedded film.

Constant thickness wafer may also be used, this wafer providing variable level of scattering between the central/peripheral part, for instance thanks to variable roughness of the wafer. Here, the final level of scattering is depending on the roughness of the wafer and the difference between the refractive index of the wafer and substrate. It is so possible to choose the refractive index difference, to adjust the level of scattered light.

According to another embodiment of the disclosure, the manufacturing of the at least one continuous scattering area is obtained by surfacing at least one optical face of the optical lens to obtain roughness.

This method, also referred to as cutting, is used to provide variable levels of roughness between center and periphery by adjusting the cutting parameters such as the cutting depth, the speed of advance, the speed of rotation, the size of the diamond cutting tool, the tool (cutting diamond/milling tool), cooling, substrate history and mechanical properties, vibrations, or tool trajectory.

According to another embodiment of the disclosure, the manufacturing of the at least one continuous scattering area is obtained by surfacing at least one optical face of the optical lens to make the substrate to pit. In other words, cracks are generated on the surface of the substrate. This can be achieved through cutting when using special substrates and under certain conditions. Feed rate is a key parameter to achieve pitting. If it is too high for a given tool radius (for instance 2 mm), cracks may be generated in the volume of the polymer. Below, cracks are avoided. So, there is again a possibility to create light scattering, in a slightly more different way than roughness.

According to another embodiment of the disclosure, the manufacturing of the at least one continuous scattering area is obtained by deposition of at least one core-shell particle during and/or after the design of the lens. The deposition may be obtained by 3D printing. The density of crosslinking points can be tuned in the shell as well as the amount of bounds of the shell with the matrix. The distribution and localization of the crosslinking points is controlled during the synthesis through the thickness of the shell. Advantageously, the diameter of the shell and the density of crosslinking in the shell can be tuned to increase mechanical properties of the lens. Advantageously, such process suppresses the problem of adhesion with the matrix during coating deposition, produces few or no waste, and discloses robust/stable results in terms of processing.

According to an embodiment of the disclosure, the manufacturing of the at least one continuous scattering area is obtained during the polishing step. The polishing step removes uniformly material. Areas with low roughness have a very low resulting level of haze, while other part still have some roughness not removed by polishing. The surfacing step can be used to provide on the lens variable level of scattering, for example higher in periphery than at the center, followed by the polishing step to provide very low scattering on center, while keeping lower but still important scattering on periphery.

According to an embodiment of the disclosure, a mask is applied on the periphery of the substrate to prevent polishing of the peripheral part of the substrate.

According to an embodiment of the disclosure, a mask is applied on specific parts of the substrate (the mask discloses a specific pattern), to prevent polishing of protected area, resulting in higher level of haze.

According to another embodiment of the disclosure, the polishing is carried out using a gross abrasive pad. Starting from a substrate with a low roughness, higher roughness can be selectively achieved on the periphery by using the gross abrasive pads.

According to another embodiment of the disclosure, the polishing is obtained by using a soft tool polishing. Starting from a substrate with a significant roughness, the roughness can be selectively reduced on the periphery.

According to another embodiment of the disclosure, the polishing is obtained through sand blasting or microbilling. Starting from a substrate with a low roughness, higher roughness can be selectively achieved on the periphery by putting a mask on the central part of the substrate to protect the central part during the process.

According to another embodiment of the disclosure, the polishing is obtained through spindle brushing. Starting from a substrate with a low roughness, higher roughness can be thus selectively achieved on the periphery. The disclosure has been described above with the aid of embodiments without limitation of the general inventive concept.

According to another embodiment of the disclosure, the manufacturing of the lens is obtained by additive manufacturing via polymer jetting, using for example a first material without core-shell to make the diffusion, and a second material to make the rest of the glass. The core-shell material may be deposited in one or more layers encapsulated in the second material. The first material may comprises one or more layers of scattering material and/or patterns to reproduce local variations in scattering.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. An optical lens comprising:
at least one continuous scattering area having a characteristic dimension d greater than or equal to 2 mm, wherein any sub-area of characteristic dimension $d_{sub}$ comprised in the at least one continuous scattering area, with $d_{sub}$ greater than or equal to 0.05 mm, verifies:

|% $Iscat\_area$ − % $Iscat\_subarea$| < 0.2*% $Iscat\_area$ with
% Iscat_area the average intensity ratio of light scattered by the continuous scattering area, and
% Iscat_subarea the average intensity ratio of light scattered by the sub-area.

2. The optical lens according to claim 1, wherein the optical lens comprises a scattering region comprising the at least one scattering area and having variable light scattering property between the geometrical center of the optical lens and the periphery of the optical lens.

3. The optical lens according to claim 2, wherein the scattering property increases radially from the geometrical center of the optical lens to the periphery of the optical lens.

4. The optical lens according to claim 2, wherein a central region of the optical lens, consisting of the region at a distance smaller than or equal to 10 mm from a reference point, has a haze smaller than or equal to 0.5%.

5. The optical lens according to claim 2, wherein a peripheral region of the optical lens, consisting of the region at a distance greater than or equal to 15 mm, from a reference point, has a haze greater than or equal to 1%.

6. The optical lens according to claim 4, wherein a peripheral region of the optical lens, consisting of the region at a distance greater than or equal to 15 mm, from a reference point, has a haze greater than or equal to 1%, and wherein the optical lens comprises a transition region disposed between the central region and the peripheral region of the optical lens, and the variation of haze between the central region and the transition region and/or the variation of haze between the transition region and the peripheral region is continuous.

7. The optical lens according to claim 1, further comprising a plurality of continuous scattering areas positioned on a structured mesh.

8. The optical lens according to claim 1, further comprising a plurality of continuous scattering areas arranged as a plurality of concentric scattering rings with a haze greater than or equal to 1% alternating with clear areas with a haze smaller than or equal to 0.3%.

9. The optical lens according to claim 1, wherein the optical lens is an ophthalmic lens intended to be worn on or in front of an eye of a wearer having at least one prescribed refractive power Px and wherein the at least one continuous scattering area provides an optical function of not focusing an image on the retina of the eye of the wearer so as to slow down the progression of the abnormal refraction of the eye.

10. Method of manufacturing an optical lens comprising the steps of:
manufacturing a lens material having two opposite optical faces, and
manufacturing at least one continuous scattering area having a characteristic dimension d greater than or equal to 2 mm,
wherein any sub-area of characteristic dimension $d_{sub}$ comprised in the at least one continuous scattering area, with dsub greater than or equal to 0.05 mm, verifies:

|% $Iscat\_area$ − % $Iscat\_subarea$| < 0.2*% $Iscat\_area$ with
% Iscat_area the average intensity ratio of visible scattered by the continuous visible light scattering area, and
% Iscat_subarea the average intensity ratio of visible scattered by the sub-area.

11. The method according to claim 10, wherein the manufacturing of the at least one continuous scattering area is obtained using a mold for a lens element having a continuous roughness area with a RMS roughness greater than or equal to 15 nm.

12. The method according to claim 10, wherein the method further comprises manufacturing a lens material having two opposite optical faces, and the manufacturing of the at least one continuous scattering area is obtained by deposition of a coating providing haze on at least one optical face.

13. The method according to claim 10, wherein the manufacturing of the at least one continuous scattering area is obtained by using a fluorescent dye.

14. The method according to claim 10, wherein the manufacturing of the at least one continuous scattering area is obtained by making the optical lens with a scattering material and by adjusting the thickness of said scattering material.

15. The method according to claim 10, wherein the manufacturing of the at least one continuous scattering area is obtained by surfacing at least one optical face of the optical lens.

16. The optical lens according to claim 3, wherein a central region of the optical lens, consisting of the region at a distance smaller than or equal to 10 mm from a reference point, has a haze smaller than or equal to 0.5%.

17. The optical lens according to claim 3, wherein a peripheral region of the optical lens, consisting of the region at a distance greater than or equal to 15 mm, from a reference point, has a haze greater than or equal to 1%.

18. The optical lens according to claim 4, wherein a peripheral region of the optical lens, consisting of the region at a distance greater than or equal to 15 mm, from a reference point, has a haze greater than or equal to 1%.

19. The optical lens according to claim 16, wherein a peripheral region of the optical lens, consisting of the region at a distance greater than or equal to 15 mm, from a reference point, has a haze greater than or equal to 1%.

* * * * *